(12) United States Patent
Yamamoto et al.

(10) Patent No.: US 11,334,087 B2
(45) Date of Patent: May 17, 2022

(54) MAGNETIC MARKER INSTALLATION METHOD AND WORK SYSTEM

(71) Applicant: AICHI STEEL CORPORATION, Tokai (JP)

(72) Inventors: Michiharu Yamamoto, Tokai (JP); Tomohiko Nagao, Tokai (JP); Hitoshi Aoyama, Tokai (JP)

(73) Assignee: AICHI STEEL CORPORATION, Tokai (JP)

( * ) Notice: Subject to any disclaimer, the term of this patent is extended or adjusted under 35 U.S.C. 154(b) by 299 days.

(21) Appl. No.: 16/495,114

(22) PCT Filed: Mar. 23, 2018

(86) PCT No.: PCT/JP2018/011869
§ 371 (c)(1),
(2) Date: Sep. 18, 2019

(87) PCT Pub. No.: WO2018/181052
PCT Pub. Date: Oct. 4, 2018

(65) Prior Publication Data
US 2020/0012294 A1 Jan. 9, 2020

(30) Foreign Application Priority Data
Mar. 28, 2017 (JP) .............................. JP2017-062202

(51) Int. Cl.
*G05D 1/02* (2020.01)
*E01F 11/00* (2006.01)
(52) U.S. Cl.
CPC ............ *G05D 1/0259* (2013.01); *E01F 11/00* (2013.01); *G05D 2201/0213* (2013.01)

(58) Field of Classification Search
CPC .... G05D 1/0259; G05D 1/021; G05D 1/0261; G05D 2201/0213; E01F 11/00; E01F 9/30; G01R 33/02
See application file for complete search history.

(56) References Cited

U.S. PATENT DOCUMENTS 5,957,983 A * 9/1999 Tominaga ................ B62D 1/28
701/41
6,378,772 B1 * 4/2002 Yonemura .............. G06K 1/125
235/384

(Continued)

FOREIGN PATENT DOCUMENTS

EP 1 519 340 A1 3/2005
EP 3 418 845 A1 12/2018

(Continued)

OTHER PUBLICATIONS

Extended European Search Report dated Nov. 6, 2020 in European Application No. 18777050.8.

(Continued)

*Primary Examiner* — Huy Q Phan
*Assistant Examiner* — Dustin R Dickinson
(74) *Attorney, Agent, or Firm* — Xsensus LLP

(57) ABSTRACT

In an installation method for laying magnetic markers (10) in a road for driving assist control on a vehicle side, a laying work vehicle (2) sequentially lays the magnetic markers (10) while moving along the road without performing a prior survey or the like of laying positions, and then by using a positioning work vehicle (3) including a magnetic sensor capable of detecting magnetism, the laid magnetic markers (10) are detected and the laying positions are identified to generate position data regarding the magnetic markers (10), thereby allowing reduction of cost of laying the magnetic markers (10).

11 Claims, 10 Drawing Sheets

(56) References Cited

U.S. PATENT DOCUMENTS

| | | | | |
|---|---|---|---|---|
| 2005/0134440 A1* | 6/2005 | Breed | ............... | G01S 17/931 |
| | | | | 701/45 |
| 2012/0001638 A1* | 1/2012 | Hall | .................. | G01V 3/08 |
| | | | | 324/345 |
| 2014/0067184 A1* | 3/2014 | Murphy | ............ | G05D 1/0265 |
| | | | | 701/23 |

FOREIGN PATENT DOCUMENTS

| | | | |
|---|---|---|---|
| JP | 61-201285 | A | 9/1986 |
| JP | 2000-276691 | A | 6/2000 |
| JP | 2005-202478 | A | 7/2005 |
| JP | 2006-72431 | A | 3/2006 |
| JP | 2006-275904 | A | 10/2006 |
| JP | 2007-263614 | A | 10/2007 |
| JP | 2007-333385 | A | 12/2007 |
| JP | 2008-82931 | A | 4/2008 |
| JP | 2009-236691 | A | 10/2009 |
| JP | 2013-519892 | A | 5/2013 |
| JP | 2015-59380 | A | 3/2015 |

OTHER PUBLICATIONS

International Search Report and Written Opinion dated May 1, 2018 for PCT/JP2018/011869 filed on Mar. 23, 2018, 10 pages including English Translation of the International Search Report.

* cited by examiner

FIG. 10
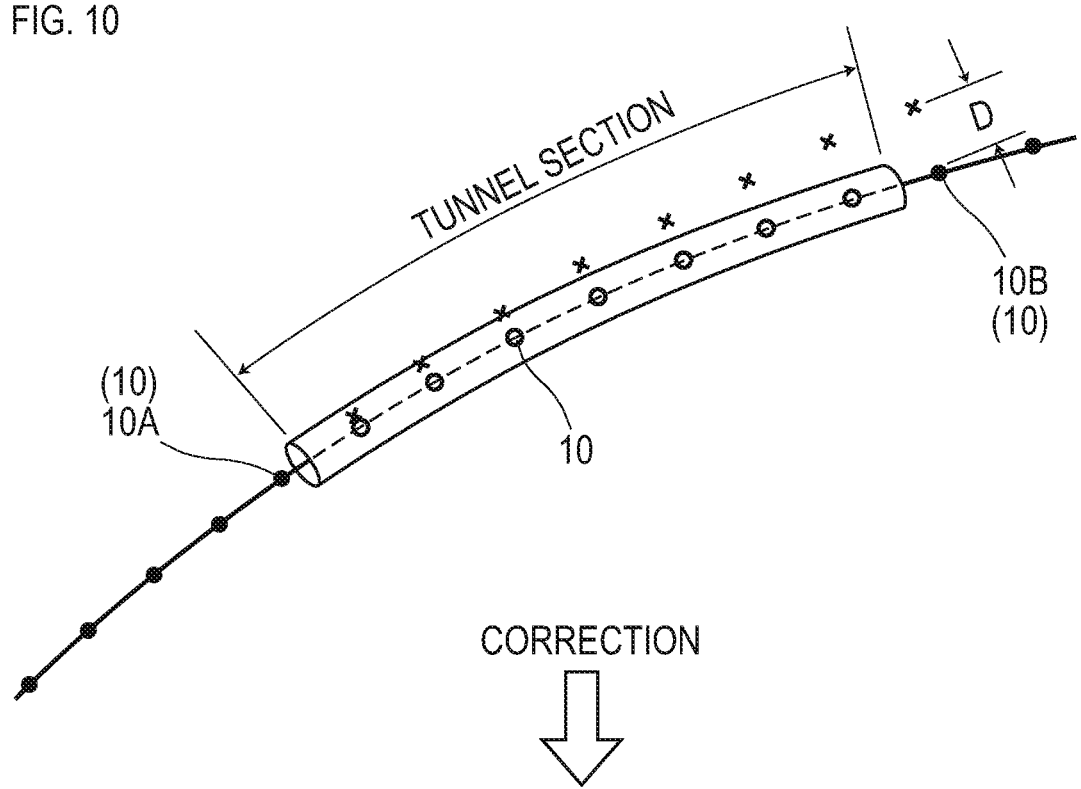
CORRECTION
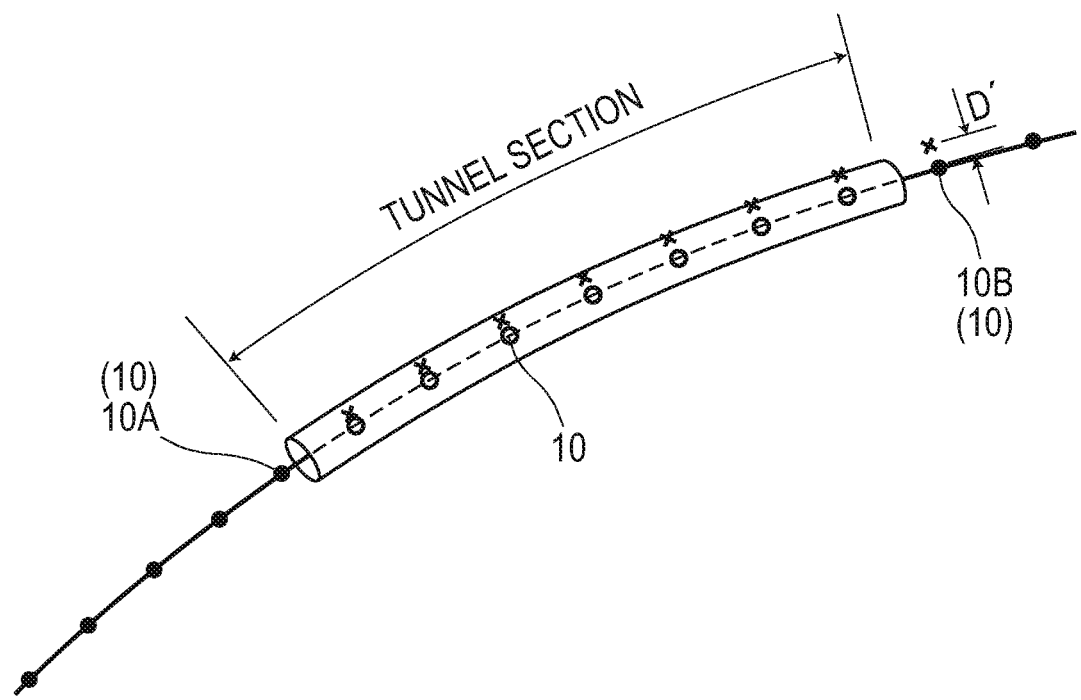

MAGNETIC MARKER INSTALLATION METHOD AND WORK SYSTEM

CROSS-REFERENCE TO RELATED APPLICATIONS

The present application is based on PCT filing PCT/JP2018/011869, filed Mar. 23, 2018, which claims priority to JP 2017-062202, filed Mar. 28, 2017, the entire contents of each are incorporated herein by reference.

TECHNICAL FIELD

The present invention relates to an installation method and work system for laying magnetic markers.

BACKGROUND ART

Conventionally, a marker detection system for vehicles for detecting magnetic markers laid in a road by a magnetic sensor attached to a vehicle has been known (for example, refer to Patent Literature 1). According to this marker detection system, for example, various driving assists using the magnetic markers laid along a lane can be achieved, such as automatic steering control, lane departure warning, and automatic driving.

CITATION LIST

Patent Literature

Patent Literature 1: Japanese Unexamined Patent Application Publication No. 2005-202478

SUMMARY OF INVENTION

Technical Problem

However, the above-described conventional magnetic markers have the following problem. For example, there is a problem in which, to achieve driving assists such as lane departure warning, many magnetic markers are required to be laid at relatively short spacings with high positional accuracy and therefore reduction in installation cost is difficult.

The present invention was made in view of the above-described conventional problem and is to provide a magnetic marker installation method and work system capable of reducing cost of laying magnetic markers.

Solution to Problem

One aspect of the present invention resides in a magnetic marker installation method for laying magnetic markers in a road for driving assist control on a vehicle side, wherein after the magnetic markers are laid in the road, by using a work apparatus including a magnetic sensor capable of detecting magnetism, the laid magnetic markers are detected and laying positions of the magnetic markers are identified to generate position data regarding the magnetic markers.

One aspect of the present invention resides in a work system for performing a work of laying magnetic markers for driving assist control on a vehicle side, including:

a laying apparatus which lays the magnetic markers in a road;

a detection apparatus which senses magnetism for detecting the magnetic markers; and a positioning apparatus which measures a position, wherein the magnetic markers laid by the laying apparatus in the road are detected by the detection apparatus, and laying positions of the magnetic markers are identified by positioning of the positioning apparatus to generate position data regarding the magnetic markers.

Advantageous Effects of Invention

In the magnetic marker installation method and work system according to the present invention, the positions of the magnetic markers after laid in the road are identified by positioning or the like to generate position data regarding the magnetic markers. In these installation method and work system, it is not required to lay the magnetic markers with high accuracy at predetermined positions defined by design or the like. Therefore, it is not required to perform a survey with high accuracy before laying the magnetic markers, and cost required for laying can be reduced.

In this manner, the magnetic marker installation method and work system according to the present invention are a method or system capable of reducing cost of laying magnetic markers.

BRIEF DESCRIPTION OF DRAWINGS

FIG. 10 is a descriptive diagram of a correction method for improving estimation accuracy of laying positions of magnetic markers in a tunnel in the second embodiment.

DESCRIPTION OF EMBODIMENTS

Figure 1:
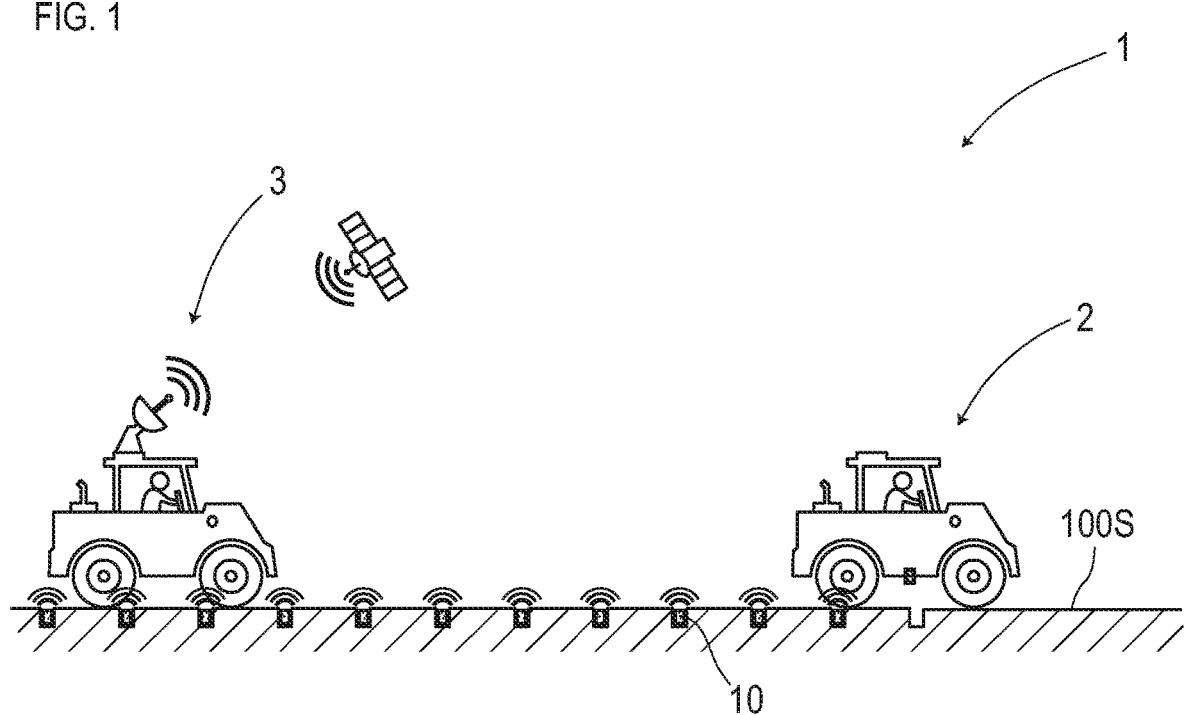
FIG. 1 is a descriptive diagram depicting a work system in a first embodiment.
Figure 2:
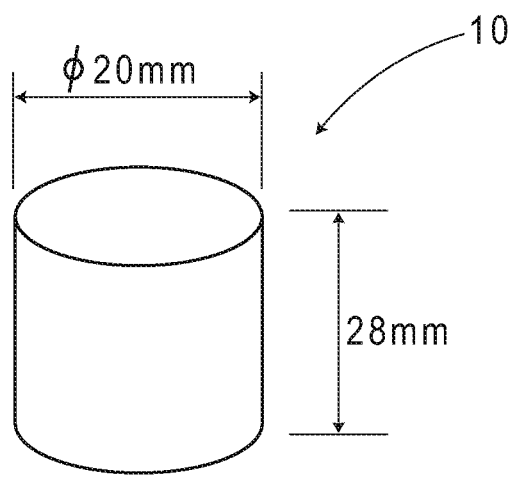
FIG. 2 is a descriptive diagram depicting a magnetic marker in the first embodiment.

In the installation method of one suitable aspect in the present invention, the laying position of the magnetic marker is identified by estimating relative position of the magnetic marker by inertial navigation calculation with taking a point where its absolute position is known as a reference position.

For example, a positioning system such as GPS (Global Positioning System) is suitable for positioning an absolute position. In particular, if positioning by RTK (RealTime Kinematic)-GPS or the like is used, the laying positions (absolute positions) of the magnetic markers can be identified with high accuracy. However, GPS, which is premised on reception of GPS waves, is unsuitable for positioning in a tunnel, on a road between buildings, and so forth. Thus, if the relative positions of the magnetic markers are estimated by inertial navigation calculation as in the above-described configuration, the laying positions of the magnetic markers can be identified with high accuracy even for those laid in a location unsuitable for reception of GPS waves, for example, in a tunnel and so forth.

Note that the reference position may be a laying position of any of the magnetic markers. For example, as for a magnetic marker laid before a tunnel, measurement of its absolute position by GPS or the like can be made, and therefore the laying position of this magnetic marker may be taken as the reference position. Alternatively, a position unrelated to any magnetic marker may be taken as the reference position. For example, a point where its absolute position has been measured by GPS and a point where its absolute position is known, such as a survey stake installed in a road or facility, may be used as the reference position.

Furthermore, as for first and second magnetic markers where their absolute positions are known, a relative position of the second magnetic marker may be estimated by inertial navigation calculation with taking a position of the first magnetic marker as the reference position, and a relative position of a magnetic marker positioned in between the first and second magnetic markers may be estimated by an estimation process of making a difference between the relative position of the second magnetic marker and an actual relative position of the second magnetic marker with respect to the first magnetic marker closer to zero.

The difference between the actual relative position of the second magnetic marker and the relative position by estimation of the second magnetic marker helps improving accuracy of estimation process by inertial navigation calculation. With the estimation process of making an error of this difference closer to zero, the relative position of the magnetic marker positioned in between the first magnetic marker and the second magnetic marker can be estimated with high accuracy.

In the installation method of one suitable aspect in the present invention, by using, as the work apparatus, a work vehicle including a detection apparatus which detects the magnetic markers by using the magnetic sensor and a positioning apparatus which measures a position, the magnetic markers are detected while the work vehicle is moving along the road, and the laying positions of the magnetic markers are identified based on the position measured by the positioning apparatus.

While detecting the laid magnetic markers during road traveling, the work vehicle as the work apparatus can efficiently identify their laying positions.

In the work system of one suitable aspect in the present invention, the detection apparatus and the positioning apparatus are provided in one work apparatus, and the one work apparatus can move independently from a work apparatus including the laying apparatus.

If the work apparatus including the laying apparatus and the one work apparatus including the detection apparatus and the positioning apparatus are separate work apparatuses, it is not required to perform positioning of the laying positions and so forth in cooperation with laying of the magnetic markers, and work flexibility can thus be improved. Furthermore, if the one work apparatus is independent, for example, after the work of laying the magnetic markers is performed, a work such as positioning can be repeatedly performed to calculate an average value and so forth, and positional accuracy can thus be improved.

The one work apparatus in the work system of one suitable aspect in the present invention is a work vehicle that can travel on the road.

In this case, the one work apparatus, which is the work vehicle, is caused to travel along the road with the magnetic markers laid therein, thereby allowing the work to be efficiently performed. The efficient work is effective in reducing cost of laying the magnetic markers.

EMBODIMENTS

Aspects for implementation of the present invention are specifically described by using the following embodiments.

First Embodiment

The present embodiment is an example of an installation method of laying magnetic markers 10 in a road and a work system 1 for implementing this installation method. Details of this are described by using FIG. 1 to FIG. 8.

The installation method of the magnetic markers 10 of the present embodiment is an installation method by a work system 1 including a laying work vehicle 2 which lays the magnetic markers 10 in a road and a positioning work vehicle 3 which measures laying positions of the magnetic markers 10 after laying, as in FIG. 1. This installation method has one technical feature in which the magnetic markers 10 are efficiently laid by allowing a positional error and then the laying positions of the magnetic markers 10 are identified to generate position data.

In this installation method, it is not required to perform a survey with high accuracy when laying the magnetic markers 10, and thus the laying work can be efficiently completed. In particular, when the magnetic markers 10 are laid in an existing road, a period for performing the laying work by closing the road can be shortened, and social cost with installation of the magnetic markers 10 can be reduced.

First, a general outline of the magnetic marker 10 is described. The magnetic marker 10 is a small-sized marker forming a columnar shape having a diameter of 20 mm and a height of 28 mm, as in FIG. 2. A magnet forming the magnetic marker 10 is an isotropic ferrite plastic magnet formed by dispersing a magnetic powder of iron oxide as a magnetic material in a polymer material as a base material, and has a characteristic of a maximum energy product (BHmax)=6.4 kJ/m3.

The magnet of magnetic marker 10 is a magnet with a magnetic flux density of the surface being on the order of 45 mT (millitesla) and a magnetic flux density reaching a height of 250 mm being on the order of 8 μT. Since the magnetic material of the magnet as an isotropic ferrite plastic magnet is iron oxide, the magnet is resistant to corrosion, and is not required to be accommodated in a metal-made case or the like. The magnetic marker 10 can be directly accommodated and laid in a small hole having, for example, a diameter on the order of 25 to 30 mm and a depth on the order of 35 to 40 mm.

The laying work vehicle 2 (FIG. 1) is a work apparatus which lays the magnetic markers 10 in a road, and has a function as a laying apparatus which lays the magnetic markers 10 in a road. Although depiction is omitted in the drawing, this laying work vehicle 2 includes a palette as an accommodation box for the magnetic markers 10, a unit which provides accommodation holes in a road surface, a unit which arranges the magnetic markers 10 in the palette into the accommodation holes one by one, a unit which supplies a filler to the accommodation holes where the magnetic markers 10 are arranged, and so forth. By using the laying work vehicle 2 including these units and so forth, a series of works from formation of the accommodation holes for the magnetic markers 10 to the process after the magnetic markers 10 are arranged can be performed by one apparatus.

The laying work vehicle 2 includes a steering wheel for a driving operator to operate and a vehicle speed sensor for measuring a vehicle speed. The laying work vehicle 2 set in laying work mode automatically performs a work of laying each magnetic marker 10 during low-speed traveling by steering-wheel operation by the driving operator every time a traveling distance obtained by integration of vehicle speeds reaches a predetermined distance.

Figure 3:
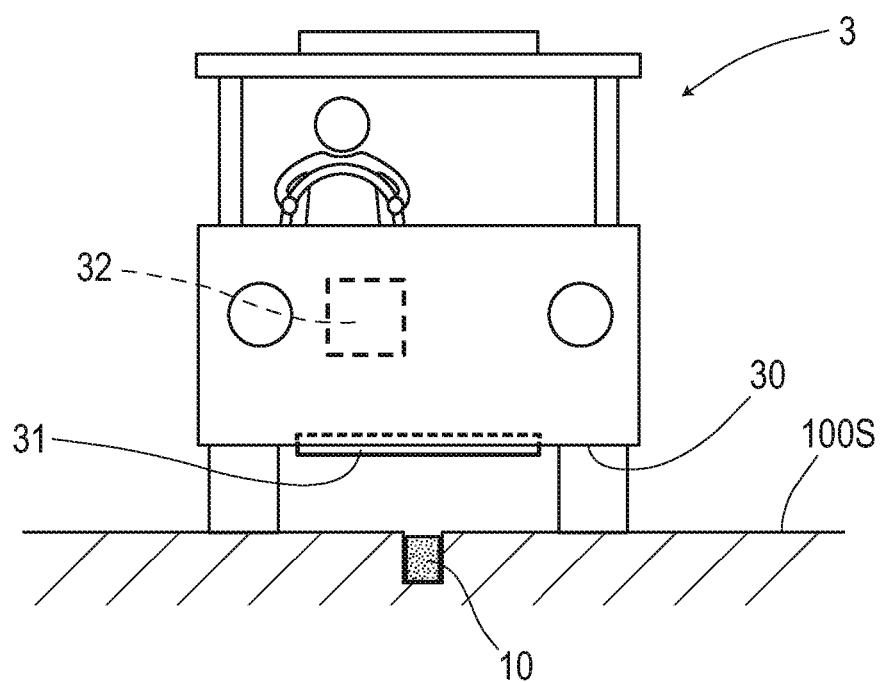
FIG. 3 is a front view of a positioning work vehicle in the first embodiment.
Figure 4:
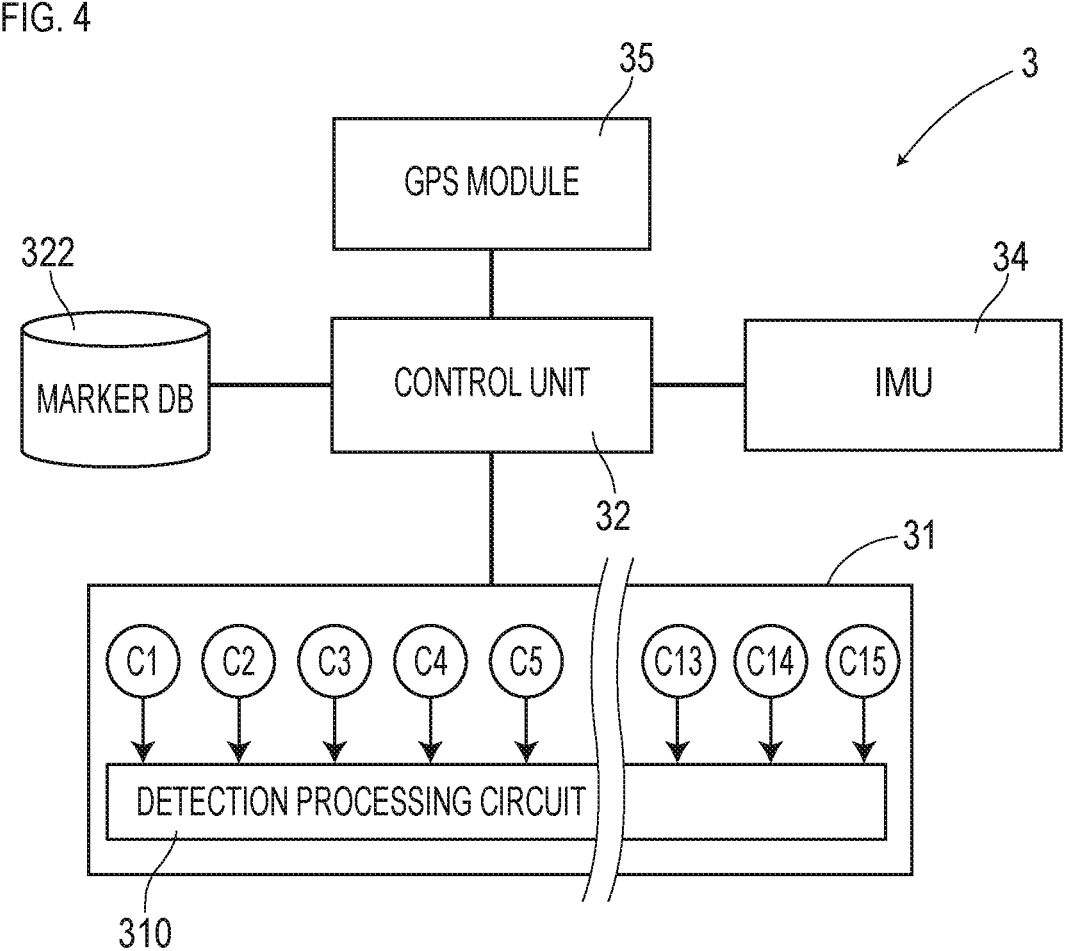
FIG. 4 is a block diagram depicting an electrical configuration of the positioning work vehicle in the first embodiment.
Figure 5:
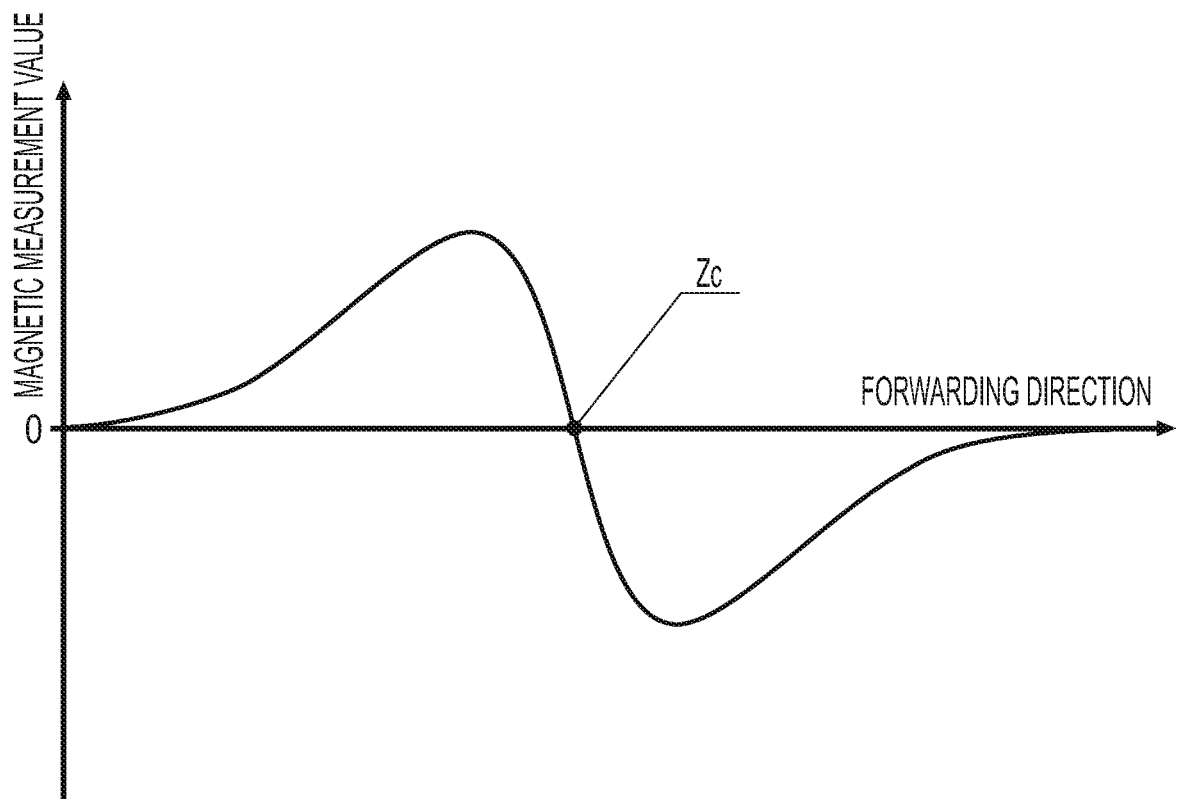
FIG. 5 is a descriptive diagram exemplarily depicting changes of a magnetic measurement value in a forwarding direction at the time of passage over a magnetic marker in the first embodiment.

The positioning work vehicle 3 is, as in FIG. 3 and FIG. 4 and as with the laying work vehicle 2, a work vehicle which travels by steering-wheel operation by a driving operator to measure and identify the laying position of the magnetic marker 10 during traveling. The positioning work vehicle 3 includes a sensor unit 31 with magnetic sensors Cn (n is an integer from 1 to 15) arrayed in a vehicle-width direction, a GPS module 35 which performs positioning by GPS, an IMU (Inertial Measurement Unit) 34 which performs positioning by inertial navigation calculation, a control unit 32, a marker database (hereinafter a marker DB) 322 for storing position data regarding the magnetic markers 10, and so forth.

Note that depiction of the GPS module 35, the IMU 34, the marker DB 322, and so forth is omitted in FIG. 3. Also, the configuration of the IMU 34 which performs positioning by inertial navigation calculation, a positioning method by inertial navigation calculation, and so forth will be described in detail in a second embodiment further below.

The sensor unit 31 is, as in FIG. 3 and FIG. 4, a unit attached to a vehicle body floor 30 corresponding to the bottom surface of the positioning work vehicle 3, and has a function as a detection apparatus which detects the magnetic markers 10. The sensor unit 31 is arranged, for example, inside the front bumper. In the case of the positioning work vehicle 3 of a truck type of the present embodiment, the attachment height of the sensor unit 31 with reference to a road surface 100S is 250 mm.

The sensor unit 31 includes fifteen magnetic sensors Cn arrayed along the vehicle-width direction at a spacing of 10 cm and a detection processing circuit 310 having a CPU and so forth not depicted incorporated therein (refer to FIG. 4). The sensor unit 31 is attached to the vehicle body so that a central magnetic sensor C8 among the fifteen magnetic sensors Cn is positioned at the center of the vehicle in the vehicle-width direction.

The magnetic sensors Cn are MI sensors which detect magnetism by using the known MI effect (Magnet Impedance Effect) in which the impedance of a magneto-sensitive body such as an amorphous wire sensitively changes in response to the external magnetic field. The magnetic sensors Cn are configured to detect magnitude of magnetic components in two orthogonal directions. In the sensor unit 31, the magnetic sensors Cn are incorporated so as to sense magnetic components in a forwarding direction and the vehicle-width direction of the positioning work vehicle 3.

The magnetic sensors Cn achieve high sensitivity with a measurement range of the magnetic flux density of ±0.6 mT and a magnetic flux resolution of 0.02 µT within the measurement range. As described above, the magnetic markers 10 act magnetism on the order of 8 µT at the height of 250 mm, which is the attachment position of the sensor unit 31. By using the magnetic sensors Cn having a magnetic flux resolution of 0.02 µT, the magnetism of the magnetic markers 10 can be sensed with high reliability.

The detection processing circuit 310 is an arithmetic circuit which performs various arithmetic processes such as a process of detecting any magnetic marker 10 and a process of measuring a lateral shift amount in the vehicle-width direction with respect to the magnetic marker 10. This detection processing circuit 310 is configured to include a CPU (central processing unit) which performs computations as well as memory elements, such as a ROM (read only memory) and RAM (random access memory), and so forth.

The detection processing circuit 310 acquires a sensor signal outputted from each of the magnetic sensors Cn to perform various arithmetic processes, and inputs, to the control unit 32, that the magnetic marker 10 has been detected and marker detection information such as the above-described lateral shift amount with respect to this magnetic marker 10.

As described above, the magnetic sensors Cn are configured to measure magnetic components in the forwarding direction and the vehicle-width direction of the vehicle. For example, when any of these magnetic sensors Cn moves in the forwarding direction to pass straight above any magnetic marker 10, the magnetic measurement value in the forwarding direction is reversed between positive and negative before and after the magnetic marker 10 as in FIG. 5, and changes so as to cross zero at the position of the magnetic marker 10. Therefore, during traveling of the above-described positioning work vehicle 3, when zero-cross Zc occurs where the magnetism detected by any of the magnetic sensors Cn in the forwarding direction is reversed between positive and negative, it can be determined that the sensor unit 31 is positioned straight above the magnetic marker 10. The detection processing circuit 310 determines that the magnetic marker 10 is detected when, as described above, the sensor unit 31 is positioned straight above the magnetic marker 10 and the zero-cross of the magnetic measurement value in the forwarding direction occurs.

Figure 6:
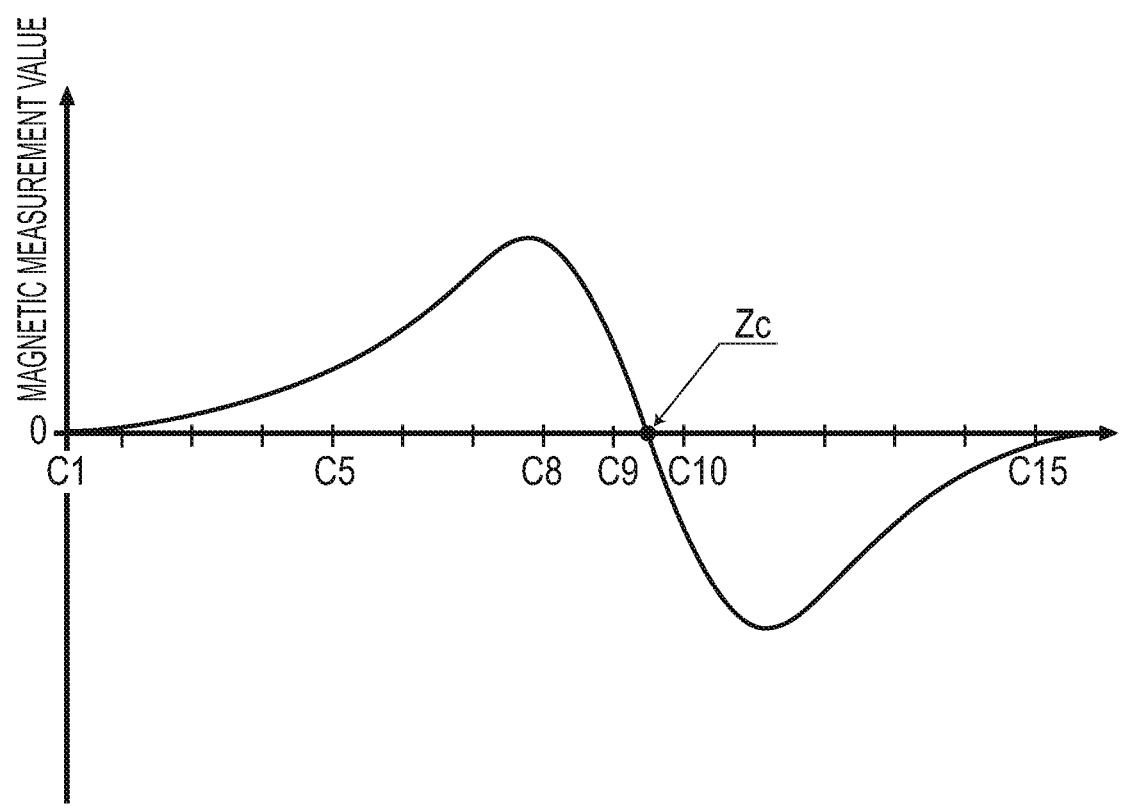
FIG. 6 is a descriptive diagram exemplarily depicting a distribution curve of magnetic measurement values in a vehicle-width direction by magnetic sensors Cn arrayed in the vehicle-width direction in the first embodiment.

Also, for example, for a magnetic sensor with the same specifications as those of the magnetic sensors Cn, a movement along a virtual line in the vehicle-width direction passing straight above the magnetic marker 10 is assumed. In this assumption, the magnetic measurement value in the vehicle-width direction is reversed between positive and negative on both sides across the magnetic marker 10 and changes so as to cross zero at a position straight above the magnetic marker 10. In the case of the sensor unit 31 with fifteen magnetic sensors Cn arrayed in the vehicle-width direction, the magnetism in the vehicle-width direction detected by any of the magnetic sensors Cn varies, that is, positive or negative, depending on which side the sensor is present with respect to the magnetic marker 10 (FIG. 6).

Based on a distribution curve of FIG. 6 exemplarily depicting the magnetic measurement values in the vehicle-width direction of each of the magnetic sensors Cn of the sensor unit 31, a position in between adjacent two magnetic sensors Cn across the zero-cross Zc where the magnetism in the vehicle-width direction is reversed between positive and negative, or a position straight below any of the magnetic sensors Cn where the detected magnetism in the vehicle-width direction is zero and the magnetism of those on both outer sides of the magnetic sensors Cn is reversed between positive and negative is the position of the magnetic marker 10 in the vehicle-width direction. The detection processing circuit 310 measures a deviation of the position of the magnetic marker 10 in the vehicle-width direction with respect to the center position (the position of a magnetic sensor C8) of the sensor unit 31 as the above-described lateral shift amount. For example, in the case of FIG. 6, the position of the zero-cross Zc is a position corresponding to C9.5 around the midpoint between C9 and C10. As described above, since the spacing between the magnetic sensors C9 and C10 is 10 cm, the lateral shift amount of the magnetic marker 10 is (9.5−8)×10 cm with reference to C8 positioned at the center of the sensor unit 31 in the vehicle-width direction.

The GPS module 35 (FIG. 4) is a module which performs positioning computation by GPS. This GPS module 35 includes a function as mobile station of RTK (RealTime Kinematic)-GPS which enhances positioning accuracy by receiving correction data from a fixed station not depicted. The GPS module 35 serving as one example of the positioning apparatus achieves positioning with high accuracy by receiving GPS waves as well as the above-described correction data of the fixed station.

Note that a positional relation with the sensor unit 31 in the positioning work vehicle 3 is preset in the GPS module 35. With this, the GPS module 35 is set to output position data of the absolute position of the magnetic sensor C8 positioned at the center of the sensor unit 31.

The control unit 32 is, as in FIG. 4, a unit including an electronic substrate (depiction is omitted in the drawing) having implemented thereon a CPU (central processing unit) which performs various computations as well as memory elements such as a ROM and RAM, and so forth. This control unit 32 identifies a laying position (absolute position) of the magnetic marker 10 based on the marker detection information by the sensor unit 31, the positioning information by the GPS module 35, and so forth to generate position data. Then, the control unit 32 sequentially stores the generated position data in the marker DB 322.

The procedure of installing the magnetic markers 10 by the above-configured work system 1 is described.

The laying work vehicle 2 is driven at low speed by steering-wheel operation by the driving operator trying to travel along a lane. This laying work vehicle 2 automatically performs a laying work during traveling to arrange the magnetic markers 10 at approximately constant spacings. In this laying work, the magnetic markers 10 are sequentially laid without identifying positions by a prior survey or the like. Thus, the laying positions of the magnetic markers 10 by this laying work vehicle 2 are approximate positions.

In the installation method of the present embodiment, after laying of the magnetic markers 10 in the road is completed, the positioning work vehicle 3 is made to travel along that road, thereby identifying the laying position of each magnetic marker 10. Having the sensor unit 31 with the plurality of magnetic sensors Cn arrayed in the vehicle-width direction, this positioning work vehicle 3 can detect the magnetic marker 10 with high reliability even when traveling by steering-wheel operation by the driving operator.

Figure 7:
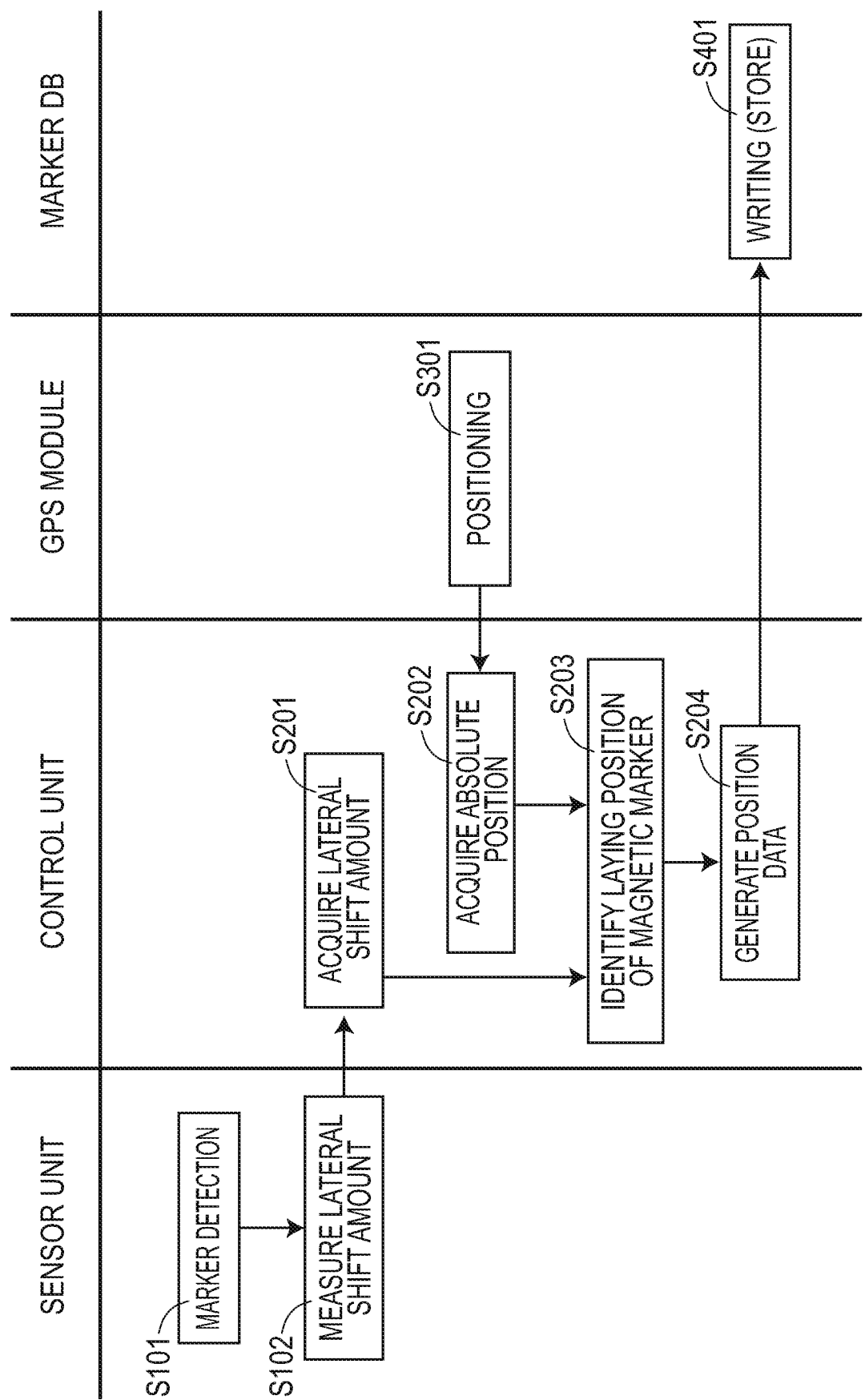
FIG. 7 is a descriptive diagram of a flow of process by the positioning work vehicle in the first embodiment.

In the following, details of the process is described with reference to FIG. 7, in which the positioning work vehicle travels while detecting the magnetic markers 10, thereby sequentially storing position data of the laying positions of the magnetic markers 10 in the marker DB 322.

When the positioning work vehicle 3 reaches the magnetic marker 10, the sensor unit 31 detects the magnetic marker 10 (S101) and measures a lateral shift amount with respect to the detected magnetic marker 10 (S102).

When acquiring marker detection information including the lateral shift amount with respect to the magnetic marker 10 from the sensor unit 31 (S201), the control unit 32 acquires position data of an absolute position (S202) by positioning of the GPS module 35 (S301). Note that, as described above, the lateral shift amount outputted by the sensor unit 31 is a distance in the vehicle-width direction with reference to the central magnetic sensor C8. Also, as described above, the position measured by the GPS module 35 is the position of the central magnetic sensor C8 of the sensor unit 31.

The control unit 32 identifies the laying position (absolute position) of the magnetic marker 10 by combining the absolute position by positioning of the GPS module 35 and the lateral shift amount acquired from the sensor unit 31 (S203). Specifically, the control unit 32 identifies, as the laying position (absolute position) of the magnetic marker 10, a position shifted by the lateral shift amount acquired from the sensor unit 31 from the absolute position by positioning of the GPS module 35.

The control unit 32 generates position data representing the laying position of the magnetic marker 10 identified as described above (S204), and sequentially stores the position data in the marker DB 322 (S401). With this, in the marker DB 322, a database having the position data representing the laying position of each magnetic marker 10 stored therein can be constructed.

As described above, in the work system 1 and the installation method of the magnetic markers 10 by this work system 1 of the present embodiment, the laying position of the magnetic marker 10 laid in the road is identified by positioning, and position data representing this laying position is generated. With these installation method and work system 1, it is less necessary for performing a highly-accurate prior survey of positions where the magnetic markers 10 are to be laid. After the magnetic markers 10 are laid, their laying positions can be identified by positioning or the like to generate position data of the magnetic markers 10.

With this installation method, when the magnetic markers 10 are laid, a highly-accurate prior survey can be omitted, and the laying work can be efficiently completed. In particular, when the magnetic markers 10 are laid in an existing road, a period for performing the laying work requiring road closing can be shortened, and social cost with installation of the magnetic markers 10 can be reduced.

The installation method the magnetic markers 10 and the work system 1 according to the present invention are an extremely effective method and system capable of reducing installation cost of the magnetic markers 10.

In place of the present embodiment, the following configurations and so forth may be adopted.

A wireless communication apparatus for connection to a communication network such as the Internet may be provided in the positioning work vehicle 3, and the marker DB 322 may be provided in a server apparatus on the Internet. When driving assist control is performed on the vehicle side, the server apparatus may be accessed via the Internet to acquire the position data in the marker DB 322.

The position data stored in the marker DB 322 is useful data when driving assist control using the magnetic markers 10 is performed on the vehicle side. For example, when the vehicle includes a positioning apparatus by GPS and an IMU as apparatuses for measuring its own vehicle position and can refer to a database similar to the above-described marker DB 322, the vehicle can refer to the database using its own vehicle position measured when the magnetic marker 10 is detected.

If the database is referred to in this manner, the magnetic marker corresponding to the position data closest to the own vehicle position can be identified as the detected magnetic marker 10. Then, highly-accurate position data representing the laying position of that magnetic marker 10 can be acquired from the database. If the highly-accurate position data of the detected magnetic marker 10 can be acquired as described above, the own vehicle position can be identified with high accuracy and, for example, automatic driving using detailed 3D map data or the like can be achieved.

Figure 8:
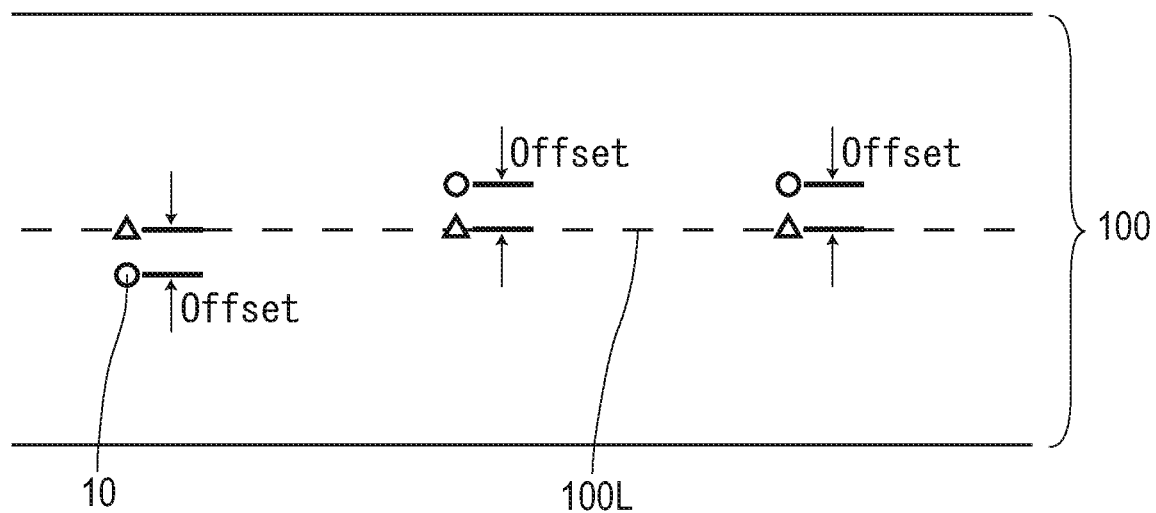
FIG. 8 is a descriptive diagram exemplarily depicting other data to be stored in a marker DB in the first embodiment.

In place of or in addition to the position data representing the laying positions of the magnetic markers 10, data of a deviation Offset in the vehicle-width direction with respect to a design laying line 100L for arranging the magnetic markers 10 may be stored in the marker DB 322 as position data (refer to FIG. 8). When driving assist control such as automatic steering control for causing the vehicle to travel along a lane 100 and/or lane departure warning is performed, the marker DB 322 is referred to every time the magnetic marker 10 is detected to acquire position data of the deviation Offset of that magnetic marker 10 in the vehicle-width direction. With the use of this deviation Offset, an actual laying position of the magnetic marker 10 indicated by a circle mark can be corrected, and a designed laying position indicated by a triangle mark can be identified. In this case, driving assist control similar to the case where the magnetic markers 10 are arranged along the laying line 100L can be achieved on the vehicle side.

In the sensor unit 31, common noise acts on each of the magnetic sensors Sn, which is almost uniform magnetic noise derived from a large-sized magnetism generation source, for example, an iron bridge or another vehicle as well as the magnetism of the earth. This common noise has a high possibility of almost uniformly acting on each of the magnetic sensors Cn of the sensor unit 31. Thus, the magnetic marker 10 may be detected by using a differential value between magnetic measurement values of the respective magnetic sensors Cn arrayed in the vehicle-width direction. With this differential value representing a magnetic gradient in the vehicle-width direction, the common noise acting almost uniformly on each of the magnetic sensors Cn can be effectively reduced.

In the present embodiment, the magnetic sensors Cn with sensitivity in the forwarding direction and the vehicle-width direction of the vehicle are adopted. In place of this, magnetic sensors with sensitivity in a uniaxial direction such as the vertical direction, the forwarding direction, or the vehicle-width direction may be used; magnetic sensors with sensitivity in a biaxial direction of the vehicle-width direction and the vertical direction or a biaxial direction of the forwarding direction and the vertical direction may be used; or magnetic sensors with sensitivity in a triaxial direction of the vehicle-width direction, the forwarding direction, and the vertical direction may be adopted. If magnetic sensors with sensitivity in a plurality of axial directions are used, both the magnitude of magnetism and the magnetism acting direction can be measured, and magnetic vectors can be generated. By using a difference between magnetic vectors and a change ratio of the difference in the forwarding direction, magnetism of the magnetic markers 10 and external disturbance of magnetism may be distinguished.

Note in the present embodiment, the laying work vehicle 2 and the positioning work vehicle 3 each traveling by steering-wheel operation by the driving operator are exemplarily described. These work vehicles may be vehicles which are taught in advance route data representing the absolute position of a traveling route and so forth and automatically travel by following the route data. Also, these work vehicles may be vehicles which automatically travel by recognizing a lane by using a lane mark which sections the lane, or the like. Furthermore, the positioning work vehicle 3 may be a vehicle which automatically travels by traveling control with a control target value of the lateral shift amount with respect to the detected magnetic marker 10 being set at zero and measures the laying position of each magnetic marker 10 during its traveling.

In the present embodiment, the magnetic marker 10 in a columnar shape having a diameter of 20 mm and a height of 28 mm is exemplarily described. However, for example, a magnetic marker in a sheet shape having a thickness on the order of 1 to 5 mm and a diameter on the order of 80 to 120 mm can also be adopted. As a magnet of this magnetic marker, for example, a ferrite rubber magnet and the like, which is a magnet similar to a magnet sheet for business use or to be used in the kitchen or the like, and so forth may be adopted.

Second Embodiment

The present embodiment is an example in which the installation method of the magnetic markers 10 and the work system in the first embodiment is applied to the magnetic markers 10 laid in a tunnel where GPS waves cannot be received, between buildings where reception tends to become unstable, or the like. Details of this are described with reference to FIG. 4, FIG. 9, and FIG. 10.

In the present embodiment, the laying position of the magnetic marker 10 is measured by using a relative position estimated by the IMU 34 of FIG. 4 by inertial navigation calculation. The IMU 34 includes a gyroscope which measures an azimuth and an acceleration sensor which measures acceleration.

Figure 9:
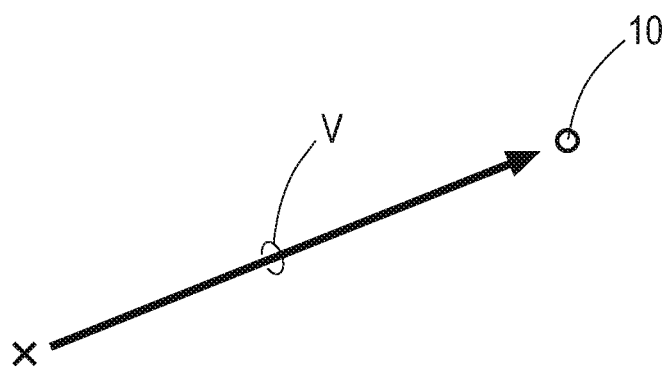
FIG. 9 is a descriptive diagram of a relative position estimation method in a second embodiment.

The IMU 34 computes a displacement amount by second-order integration of acceleration, and performs integration of displacement amounts along the azimuth measured by the gyroscope to estimate a relative position with respect to a reference position. If a relative position (azimuth and distance) represented by a vector V starting from a reference position marked with a cross mark as indicated by an arrow in FIG. 9 is calculated, the laying position (circle mark) of the magnetic marker 10 away from the reference position, where its absolute position is known, by the relative position can be identified.

Estimation of the relative position by the IMU 34 is effective in, for example, positioning the magnetic markers 10 in a tunnel where GPS waves cannot be received. For example, by using the IMU 34, the relative position of any magnetic marker 10 in the tunnel can be estimated by taking the laying position of a magnetic marker 10A before a tunnel, the marker where its absolute position can be measured by GPS (FIG. 10), as a reference position. The laying position of the magnetic marker 10 in the tunnel can be identified as a position away from the laying position of the magnetic marker 10A before the tunnel by the relative position estimated by the IMU 34. As with the first embodiment, the control unit 32 sequentially stores position data of the laying positions of the magnetic markers 10 in the tunnel identified by estimation of the relative positions in this manner in the marker DB 322.

According to the installation method of the present embodiment, the positions of the magnetic markers 10 laid in a location where GPS waves cannot reach, such as the magnetic markers 10 in a tunnel, can also be identified, and position data indicating the laying positions can be stored in the marker DB 322.

Note that in the IMU 34, as in FIG. 10, there is a tendency in which errors are accumulated as the magnetic marker becomes away from the reference position and accuracy of estimation of the laying position (cross mark) decreases as the magnetic marker 10 becomes away from the first magnetic marker 10A before the tunnel which is the reference position. As a method of reducing this decrease in estimation accuracy, there are a method of correcting the relative position to be estimated by inertial navigation calculation, a method of correcting an input value in inertial navigation calculation such as an azimuth measured by the gyroscope or a measurement acceleration by the acceleration sensor, and so forth.

For example, as for a second magnetic marker 10B immediately after the exit of the tunnel, a laying position identified based on estimation of a relative position with reference to the laying position of the first magnetic marker 10A before the tunnel and a laying position measured by GPS can be acquired. An estimation process may be applied, including the process of identifying error D which is a difference between the laying positions acquired by inertial navigation calculation and that by GPS, followed by a correction of this error D closer to zero, to estimate the relative position.

For example, on an assumption that the error is proportional to a distance from the first magnetic marker 10A which serves as a reference for inertial navigation calculation, a correction process to deduct the error amount from the laying position acquired by inertial navigation calculation may be performed. Alternatively, for the azimuth measured by the gyroscope or the acceleration measured by the acceleration sensor, a measurement initial value may be identified in which the above-described error becomes zero, or a correction coefficient for computing an azimuth or acceleration, in which the above-described error becomes zero. The estimation process of mitigating the above-described error D to an error D' in the drawing allows improvement of estimation accuracy of the relative positions of the magnetic markers 10, indicated by circle marks, in the tunnel between the first magnetic marker 10A and the second magnetic marker 10B. And, with the improvement of estimation accuracy of the relative position, positioning accuracy of the laying positions of the magnetic markers 10 in the tunnel can be improved.

Note that the estimation work on the relative positions by inertial navigation calculation may be performed repeatedly by having the positioning work vehicle 3 to travel repeatedly. Alternatively, with focus on a cumulative increase in estimation error in accordance with distance, in addition to estimation of relative positions by having the positioning work vehicle 3 to travel in a road direction, estimation by having the positioning work vehicle 3 to travel in a reverse direction may be performed. Applying a statistical process such as an averaging process to the results of a plurality of times of estimation of relative positions is effective in reducing the estimation error.

In the first embodiment, a method to identify the laying position based on a positioning by the GPS module 35 has been described regarding the magnetic marker 10 laid at a point where GPS waves can be received. Also, in the present embodiment, a method based on position estimation by the IMU 34 to identify the laying position of the magnetic marker 10 laid at a point where GPS waves cannot be received, such as in a tunnel, was described. As a method to identify the position of the magnetic marker 10 laid in a location where GPS waves can be received, a method which combines positioning by the GPS module 35 and position estimation by the IMU 34 may be adopted to further improve positional accuracy.

In the first embodiment and the present embodiment, the configuration is exemplarily described in which the sensor unit 31 and the IMU 34 are separate units. In place of this, a sensing unit having the sensor unit 31 and the IMU 34 integrally incorporated therein may be adopted.

The positioning work vehicle capable of inertial navigation calculation using the IMU 34 has been exemplarily described. In place of the IMU 34, the positioning work vehicle including a gyrocompass may be used. By using the gyrocompass, inertial navigation calculation can be achieved.

Note that other configurations and operations and effects are similar to those in the first embodiment.

While in the foregoing, specific examples of the present invention have been described in detail as in the embodiments, these specific examples each merely disclose an example of technology included in the scope of claims for patent. Needless to say, the scope of claims for patent should not be interpreted in a limited manner by the configuration, numerical values, and so forth in the specific examples. The scope of claims for patent includes techniques where the specific examples are modified, changed, or appropriately combined in various ways using publicly known technologies of those skilled in the art, and the like.

REFERENCE SIGNS LIST

1 work system
10 magnetic marker
2 laying work vehicle (work vehicle, work apparatus, laying apparatus)
3 positioning work vehicle (work vehicle, work apparatus)
31 sensor unit (detection apparatus)
310 detection processing circuit
32 control unit
322 marker database
34 IMU (positioning apparatus)
35 GPS module (positioning apparatus)

The invention claimed is:

1. A magnetic marker installation method, comprising:
   (a) laying, using a laying work vehicle, a plurality of magnetic markers in a road at spacings without identifying positions of the plurality of magnetic markers to be laid, the plurality of magnetic markers having magnetism;
   (b) after laying the plurality of magnetic markers by the laying work vehicle, detecting, using a work apparatus including a magnetic sensor, a first magnetic marker of the plurality of magnetic markers, using the magnetic sensor;
   (c) measuring a lateral shift amount of the work apparatus with respect to the first magnetic marker that has been detected;
   (d) acquiring an absolute position of the work apparatus when the work apparatus detects the first magnetic marker;
   (e) identifying a laying position of the first magnetic marker using the measured lateral shift amount and the acquired absolute position;
   (f) generating position data representing the laying position of the first magnetic marker;
   (g) repeating steps of (b)-(f) for other magnetic markers of the plurality of magnetic markers other than the first magnetic marker to generate a database including each position data representing each laying position of the plurality of magnetic markers.

2. The magnetic marker installation method according to claim 1, wherein
the each laying position of the plurality of magnetic markers is identified by estimating a relative position of each of the plurality of magnetic markers by inertial navigation calculation with taking a point where its absolute position is known as a reference position.

3. The magnetic marker installation method according to claim 2, further comprising:
as for second and third magnetic markers of the plurality of magnetic markers, absolute positions of which are known, estimating a relative position of the third magnetic marker by inertial navigation calculation taking a position of the second magnetic marker as the reference position, and
estimating a relative position of a magnetic marker positioned between the second and third magnetic markers is-estimated by an estimation process of making a difference between the relative position of the third magnetic marker and an actual relative position of the third magnetic marker with respect to the second magnetic marker closer to zero.

4. The magnetic marker installation method according to claim 1, wherein
by using, as the work apparatus, a work vehicle including a detection apparatus which detects the plurality of magnetic markers by using the magnetic sensor and a positioning apparatus which measures the absolute position of the work vehicle, the plurality of magnetic markers are detected while the work vehicle is moving along the road, and each laying position of the plurality of magnetic markers are identified based on the absolute position measured by the positioning apparatus.

5. The magnetic marker installation method according to claim 1, wherein
the generating of the position data generates data of a deviation of the first magnetic marker in a vehicle-width direction with respect to a design laying line for laying the plurality of magnetic markers.

6. A work system, comprising:
a laying apparatus configured to lay a plurality of magnetic markers in a road at constant spacings without identifying positions of the plurality of magnetic markers to be laid, the plurality of magnetic markers having magnetism;
a detection apparatus configured to, after the plurality of magnetic markers have been laid by the laying work vehicle,
detect a first magnetic marker of the plurality of magnetic markers, using a magnetic sensor of the detection apparatus, and
measure a lateral shift amount of the detection apparatus with respect to the first magnetic marker that has been detected; and
a positioning apparatus configured to
acquire an absolute position of the detection apparatus when the detection apparatus detects the first magnetic marker, wherein
the work system is configured to
identify a laying position of the first magnetic marker using the measured lateral shift amount and the acquired absolute position,
generate position data representing the laying position of the first magnetic marker, and
generate the position data for other magnetic markers of the plurality of magnetic markers other than the first magnetic marker to generate a database including each position data representing each laying position of the plurality of magnetic markers.

7. The work system according to claim 6, wherein
the detection apparatus and the positioning apparatus are provided in one work apparatus, and
the one work apparatus is configured to move independently from a laying work apparatus including the laying apparatus.

8. The work system according to claim 7, wherein the one work apparatus is a work vehicle configure to travel on the road.

9. The work system according to claim 6, wherein
the positioning apparatus is configured to generate the position data by generating data of a deviation of the first magnetic marker in a vehicle-width direction with respect to a design laying line for laying the plurality of magnetic markers.

10. The work system according to claim 6, wherein
the each laying position of the plurality of magnetic markers is identified by estimating a relative position of each of the plurality of magnetic markers by inertial navigation calculation with taking a point where its absolute position is known as a reference position.

11. The work system according to claim 10, wherein
the positioning apparatus is configured to:
as for second and third magnetic markers of the plurality of magnetic markers, absolute positions of which are known, estimate a relative position of the third magnetic marker by inertial navigation calculation taking a position of the second magnetic marker as the reference position; and
estimate a relative position of a magnetic marker positioned between the second and third magnetic markers by an estimation process of making a difference between the relative position of the third magnetic marker and an actual relative position of the third magnetic marker with respect to the second magnetic marker closer to zero.

* * * * *